(12) United States Patent
Dalmatov et al.

(10) Patent No.: US 11,347,428 B2
(45) Date of Patent: May 31, 2022

(54) SOLID STATE TIER OPTIMIZATION USING A CONTENT ADDRESSABLE CACHING LAYER

(71) Applicant: EMC IP Holding Company LLC, Hopkinton, MA (US)

(72) Inventors: Nickolay A. Dalmatov, St Petersburg (RU); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 67 days.

(21) Appl. No.: 16/693,863

(22) Filed: Nov. 25, 2019

(65) Prior Publication Data

US 2020/0225868 A1 Jul. 16, 2020

(30) Foreign Application Priority Data

Jan. 16, 2019 (RU) .......................... RU2019101009

(51) Int. Cl.
*G06F 3/06* (2006.01)
*G06F 13/20* (2006.01)
(Continued)

(52) U.S. Cl.
CPC ............ *G06F 3/0655* (2013.01); *G06F 3/061* (2013.01); *G06F 3/0679* (2013.01);
(Continued)

(58) Field of Classification Search
CPC ...... G06F 3/0655; G06F 3/0679; G06F 3/061; G06F 13/20; G06F 12/0873;
(Continued)

(56) References Cited

U.S. PATENT DOCUMENTS 8,756,382 B1 * 6/2014 Carlson ................. G06F 3/0676
711/154
2010/0211731 A1 * 8/2010 Mittendorff ......... G06F 12/0866
711/113

(Continued)

OTHER PUBLICATIONS

Ji-Yong Shin et al., "Gecko: Contention-Oblivious Disk Arrays for Cloud Storage", Feb. 2013, USENIX, Proceedings of the 11th USENIX conference on File and Storage Technologies, pp. 285-297 (Year: 2013).*

(Continued)

*Primary Examiner* — Reginald G Bragdon
*Assistant Examiner* — Curtis James Kortman
(74) *Attorney, Agent, or Firm* — Muirhead and Saturnelli, LLC

(57) ABSTRACT

Techniques for processing I/O operations may include: receiving, at a data storage system, a write operation that writes first data to a target logical address of a log, wherein the data storage system includes a first storage tier of rotating non-volatile storage devices and a second tier of non-volatile solid state storage devices; storing the first data of the target logical address in a first level cache; destaging the first data from the first level cache to a first physical storage location in the first storage tier; and determining, in accordance with first read activity information for the target logical address, whether to store the first data for the target logical address in a second level cache including at least a portion of the non-volatile solid state storage devices of the second tier. The second level cache is a content addressable caching layer that caches data based on read activity.

18 Claims, 7 Drawing Sheets

(51) Int. Cl.
*G06F 12/0873* (2016.01)
*G06F 12/0897* (2016.01)

(52) U.S. Cl.
CPC ...... *G06F 12/0873* (2013.01); *G06F 12/0897* (2013.01); *G06F 13/20* (2013.01); *G06F 2212/261* (2013.01)

(58) Field of Classification Search
CPC .............. G06F 12/0866; G06F 12/0897; G06F 2212/261; G06F 2212/2022
See application file for complete search history.

(56) References Cited

U.S. PATENT DOCUMENTS

| | | | | | |
|---|---|---|---|---|---|
| 2011/0265083 | A1* | 10/2011 | Davis | .................. | G06F 12/0866 718/1 |
| 2012/0297127 | A1* | 11/2012 | Belluomini | ......... | G06F 12/0866 711/103 |
| 2015/0026403 | A1* | 1/2015 | Ish | ..................... | G06F 12/0868 711/118 |
| 2017/0177266 | A1* | 6/2017 | Doerner | .............. | G06F 12/0261 |
| 2018/0364917 | A1* | 12/2018 | Ki | ....................... | G06F 12/0246 |

OTHER PUBLICATIONS

"Distributed cache", Wikipedia, Apr. 10, 2018, the Internet Archive, pp. 1-2 https://web.archive.org/web/20180410051257/https://en.wikipedia.org/wiki/Distributed_cache (Year: 2018).*

Remzi H. Arpaci-Dusseau et al., "Operating Systems: Three Easy Pieces—Chapter 43", Arpaci-Dusseau Books, Nov. 23, 2018, Version 1.00 as preserved by the Internet Archive on Nov. 23, 2018, pp. 1-16 https://web.archive.org/web/20181123120557/http://pages.cs.wisc.ed (Year: 2018).*

Mendel Rosenblum, et al., "The Design and Implementation of a Log-Structured File System," University of California at Berkeley, ACM Transactions on Computer Systems, vol. 10, No. 1, Feb. 1992, pp. 26-52.

* cited by examiner

SOLID STATE TIER OPTIMIZATION USING A CONTENT ADDRESSABLE CACHING LAYER

BACKGROUND

Technical Field

This application generally relates to data storage, and more particularly, caching.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of processing I/O operations comprising: receiving, at a data storage system, a write operation that writes first data to a target logical address of a log, wherein the data storage system includes a plurality of storage tiers including a first storage tier of rotating non-volatile storage devices and a second tier of non-volatile solid state storage devices; storing the first data of the target logical address in a first level cache; destaging the first data from the first level cache to a first physical storage location in the first storage tier; and determining, in accordance with first read activity information for the target logical address, whether to store the first data for the target logical address in a second level cache including at least a portion of the non-volatile solid state storage devices of the second tier, wherein the second level cache is a content addressable caching layer that caches data based on read activity. The method may include responsive to determining, in accordance with the first read activity information for the target logical address, to store the first data for the target logical address in the second level cache, performing first processing. The first processing may include: determining, using a hashing function, a first hash value for the first data; creating a first entry for the target logical address in a first mapping structure, said first entry including the target logical address and the first hash value; determining whether there is an existing entry for the first hash value in a second mapping structure; and responsive to determining there is an existing entry for the first hash value in the second mapping structure, determining that the first data is a duplicate of existing data already stored in the second level cache and incrementing a reference counter associated with the existing entry, wherein a second entry of the first mapping structure includes a second logical address at which the first data, having the first hash value, is stored. The first processing may include responsive to determining there is not an existing entry for the first hash value in the second mapping structure, determining that the first data is not a duplicate of existing data already stored in the second level cache and performing second processing. The second processing may include storing the first data for the first hash value in a first physical storage location in the second level cache; and creating a first entry in the second mapping structure for the first hash value, wherein the first entry includes the first hash value, includes a reference counter initialized to one (1), and identifies the first physical storage location as storing the first data associated with the first hash value. The non-volatile solid state storage devices of the second tier comprising the second level cache may be flash drives. The second level cache may include a plurality of non-volatile solid state storage devices and the first hash value may be included in a range of hash values. The range of hash values may be partitioned into a plurality subranges and each of the plurality of non-volatile solid state storage devices may be associated with one of the plurality of subranges and each non-volatile solid state storage device may be responsible for processing I/O operations directed to data content having an associated hash value in the one subrange. Each non-volatile solid state storage device may be responsible for storing data content having an associated hash value in said one subrange associated with said each non-volatile solid state data storage device. Each non-volatile solid state storage device may be responsible for reading data content having an associated hash value in said one subrange associated with said each non-volatile solid state data storage device. Each of the plurality of subranges may be partitioned in a second plurality of subranges. Each non-volatile solid state storage device may have a plurality of channels over which data on said each non-volatile solid state may be accessible in parallel. Each of the plurality of channels may be used to read data content having an associated hash value in one of the second plurality of subranges of said one subrange associated with each non-volatile solid state storage device. The method may include performing third processing to remove the first data stored at the target logical address from the second level cache. The third processing may include removing the first entry for the target logical address from the first mapping structure; determining a corresponding entry of the second mapping structure for the first hash value for the first data; and decrementing a reference counter of the corresponding entry of the second mapping structure for the first hash value for the first data. The method may include determining whether the reference counter of the corresponding entry of the second mapping structure for the first hash value for the first data is zero; and responsive to determining the reference counter of the corresponding entry of the second mapping structure for the first hash value for the first data is zero, removing the corresponding entry from the second mapping structure and freeing physical storage of the second level cache used to store the first data. The log may have a log-based data layout on physical storage provisioned for the log from the first storage tier of rotating non-volatile storage devices. Data may be written to the log at contiguous and sequential logical addresses. Data may be sequentially written to the log-based data layout of the log on provisioned physical storage of the first storage tier in segments. The log-based data layout may store multiple data blocks at physical locations in the provisioned physical storage of the first tier having a physical proximity to one another in accordance with a temporal relationship between the multiple data blocks and in accordance with logical locations in the log at which the multiple data blocks are written.

In accordance with another aspect of techniques herein is a system comprising: one or more processors; and a memory comprising code stored thereon that, when executed, performs a method of processing I/O operations comprising: receiving, at a data storage system, a write operation that writes first data to a target logical address of a log, wherein the data storage system includes a plurality of storage tiers including a first storage tier of rotating non-volatile storage devices and a second tier of non-volatile solid state storage devices; storing the first data of the target logical address in a first level cache; destaging the first data from the first level cache to a first physical storage location in the first storage tier; and determining, in accordance with first read activity information for the target logical address, whether to store the first data for the target logical address in a second level cache including at least a portion of the non-volatile solid state storage devices of the second tier, wherein the second level cache is a content addressable caching layer that caches data based on read activity.

In accordance with another aspect of techniques herein is a computer readable medium comprising code stored thereon that, when executed, performs a method of processing I/O operations comprising: receiving, at a data storage system, a write operation that writes first data to a target logical address of a log, wherein the data storage system includes a plurality of storage tiers including a first storage tier of rotating non-volatile storage devices and a second tier of non-volatile solid state storage devices; storing the first data of the target logical address in a first level cache; destaging the first data from the first level cache to a first physical storage location in the first storage tier; and determining, in accordance with first read activity information for the target logical address, whether to store the first data for the target logical address in a second level cache including at least a portion of the non-volatile solid state storage devices of the second tier, wherein the second level cache is a content addressable caching layer that caches data based on read activity. The method may include responsive to determining, in accordance with the first read activity information for the target logical address, to store the first data for the target logical address in the second level cache, performing first processing. The first processing may include determining, using a hashing function, a first hash value for the first data; creating a first entry for the target logical address in a first mapping structure, said first entry including the target logical address and the first hash value; determining whether there is an existing entry for the first hash value in a second mapping structure; and responsive to determining there is an existing entry for the first hash value in the second mapping structure, determining that the first data is a duplicate of existing data already stored in the second level cache and incrementing a reference counter associated with the existing entry, wherein a second entry of the first mapping structure includes a second logical address at which the first data, having the first hash value, is stored. The first processing may further include responsive to determining there is not an existing entry for the first hash value in the second mapping structure, determining that the first data is not a duplicate of existing data already stored in the second level cache and performing second processing. The second processing may include storing the first data for the first hash value in a first physical storage location in the second level cache; and creating a first entry in the second mapping structure for the first hash value, wherein the first entry includes the first hash value, includes a reference counter initialized to one (1), and identifies the first physical storage location as storing the first data associated with the first hash value.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
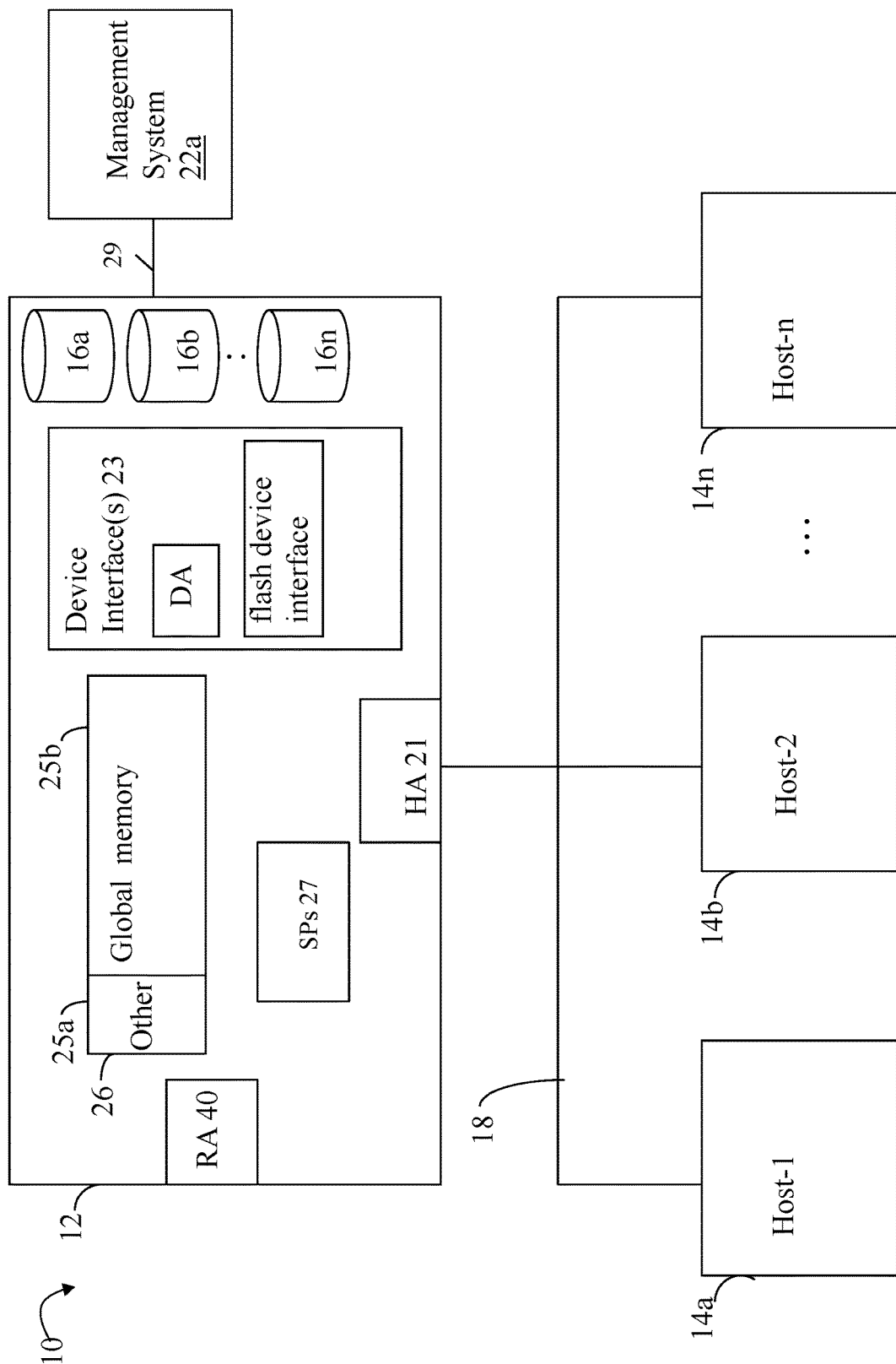
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. The hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSD may refer to solid state electronics devices as distinguished from electromechanical devices, such as hard drives, having moving parts. Flash devices or flash memory-based SSDs are one type of SSD that contains no moving mechanical parts. For example, at least some of the flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers) used to interface with the flash drives and/or other non-volatile physical data storage devices 16a-n. The DAs may also be characterized as back end components of the data storage system which interface with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Generally, techniques herein may be used in connection with any suitable storage system, appliance, device, and the like, in which data is stored.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with a data storage system such as described herein, an I/O request may be a read request to read data. The read request may be received at the data storage system at a port of a front-end component of the data storage system (such as one of the HAs as described elsewhere herein). In terms of processing a read request, a determination may be made as to whether all the requested read data is in cache (e.g., a cache hit where read data is stored in data cache). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA writes read miss data (retrieved from physical storage) to cache and the HA then retrieves the requested data from the cache to return to the requesting host.

In connection with write operations, write data received at the data storage system may be stored in cache and then written out later to physical storage, such as written to back-end physical storage devices by a DA. Once the write data is written into cache, the data may be marked as write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical non-volatile storage of the back end PDs. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

Although not illustrated in FIG. 1 for simplicity and as known by those of ordinary skill in the art, an embodiment may store additional information for cached data, such as read and write data described above that may be stored in the data cache. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN. The DA may manage and/or use cache mapping information mapping a PD and offset on the PD to a cache location including data stored at the offset on the particular PD for use in destaging write data from cache to backend non-volatile PDs 16a-n.

Data storage systems may include different storage tiers having different types of non-volatile storage media. For example, as noted above, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers—an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier).

Figure 2:
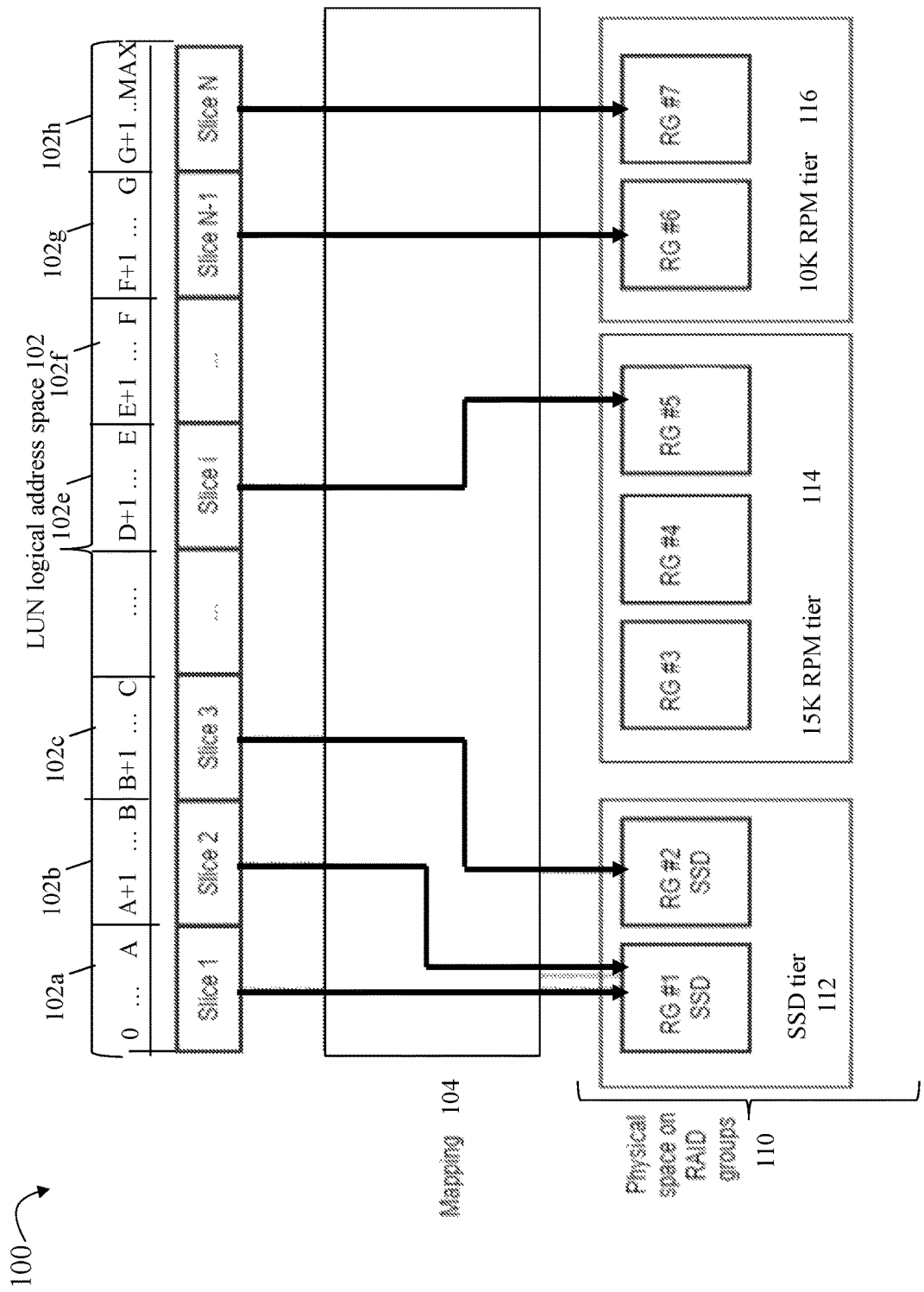
FIG. 2 is an example illustrating logical to physical mapping that may be used in an embodiment in accordance with techniques herein.

Referring to FIG. 2, shown is an example illustrating logical to physical mapping in a data storage system. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16a-n in FIG. 1. The example 100 include storage tiers 112 (SSD tier), 114 (15K RPM tier) and 116 (10K RPM tier)

comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to region of physical storage, also referred to as slices or segments, on the different PDs of different ones of the storage tiers of 110. As noted above, data storage system software may periodically remap portions of the LUN's logical address space to keep the most actively used or accessed portions of 102a-n on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

As further described below, such as in connection with FIGS. 3 and 4, a data storage system in an embodiment in accordance with techniques herein may use a log-based data layout or mapping to physical storage media. Generally, data is written sequentially and contiguously to a log file to log or record operations. The particular operations and associated data recorded in the log file may vary with the particular use of the log file. In at least one embodiment, the log file data may be written sequentially and contiguously into a memory buffer. Once the buffer is full, the collected data may subsequently be written out to physical storage provisioned for the log file. The foregoing may be continuously repeated where the memory buffer is again used to store new logged data also written sequentially and contiguously, to physical storage provisioned for the log file. Based on the above, the typical I/O pattern for the log file includes logically sequential and logically contiguous writes (e.g., logically with respect to the logical offset or ordering within the log file). Data may also be read from the log file as needed (e.g., depending on the particular use or application of the log file) so typical I/O patterns may also include reads. The log file data may have a physical storage layout corresponding to the sequential and contiguous order in which the data is written to the log file. Thus, the log file data may be written to sequential and contiguous physical storage locations in a manner corresponding to the logical sequential and contiguous order of the data in the log file.

In at least one embodiment in accordance with techniques herein, the above-noted log file and associated log-based data layout or mapping on physical storage may be used in a log-structured or log-based file system (LFS), known to those of ordinary skill in the art. For example, "The Design and Implementation of a Log-Structured File System", Mendel Rosenblum and John K. Ousterhout, University of California at Berkeley, ACM Transactions on Computer Systems, Volume 10, No. 1, February 1992, pages 26-52, which is incorporated by reference herein, is one example of a publication describing a LFS. With LFS, writes or updates to files are recorded in the log file. All updates, including updates to file data and metadata, may be buffered in an in-memory segment. When the in-memory segment (e.g., buffered segment) is full, it may be written to physical storage in a long, sequential transfer. With LFS, overwriting an existing block of a file results in writing to a new logical location in the tail of the log with associated metadata identifying the logical location in the file that is updated. Thus, with LFS, the general idea is writing all updates (e.g., for file data blocks and metadata) sequentially to the physical storage provisioned for the log file. Eventually, when writing a log file to a PD, the PD eventually becomes full.

Different techniques may be used to deallocate physical storage or obtain free physical storage for reuse depending on the particular LFS. For example, as the log is written and updates or writes are made, earlier versions of the files, blocks, inodes, and the like, that are superseded by later updates or writes may be deallocated With LFS, as well as generally other applications using the log file and associated log-based type of physical data layout or mapping to physical storage, data portions or blocks written to the log may be grouped together in the order of arrival and placed into segments. The logical to physical storage mapping of the received data portions or blocks is created. In at least one embodiment, the mapping may map a LUN identifier and LUN logical address or offset (e.g., LBA) to a physical location, which may be denoted by a segment identifier and offset within the segment. The mapping information is also placed in the segments, along with metadata and the received data portions, where all the foregoing is processed as data segments. The filled segments are added to the virtual continuous log created on, and mapped to, the physical storage having a sequentially and contiguous corresponding physical layout or structure. The log-based data layout is further illustrated in connection with FIGS. 3 and 4 described below in more detail.

Figure 3:
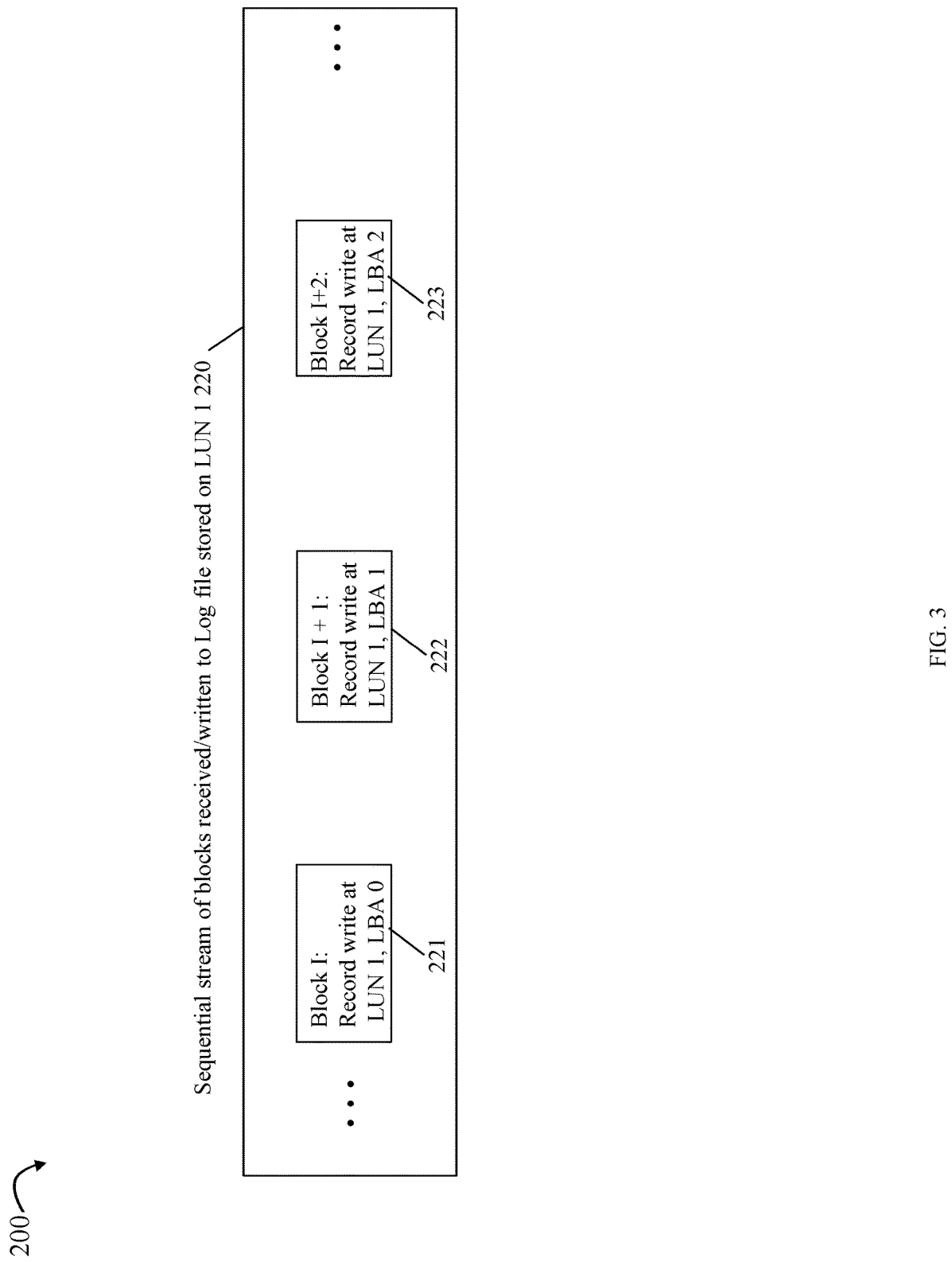
FIGS. 3 and 4 illustrate an example of log-based data layout in an embodiment in accordance with techniques herein.

Referring to FIG. 3, shown is an example 200 illustrating a sequential stream 220 of blocks received that are written to the log file in an embodiment in accordance with techniques herein. In this example, the log file may be stored on LUN 1 where logged updates, such as writes to a file, are recorded in the log file. Element 220 includes 3 writes or updates which are recorded in blocks I 221, I+1 222 and I+2 223 of the log file (e.g., where I denotes an integer offset or logical location in the log file). The blocks I 221, I+1 222, and I+2 223 may be received sequentially in the foregoing order for processing in the data storage system. Block 221, writing to block I of the log file, is a write to LUN 1, LBA 0. Block 222, writing to block I+1 of the log file, is a write to LUN 1, LBA 1. Block 223, writing to block I+2 of the log file, is a write to LUN 1, LBA 2.

Figure 4:
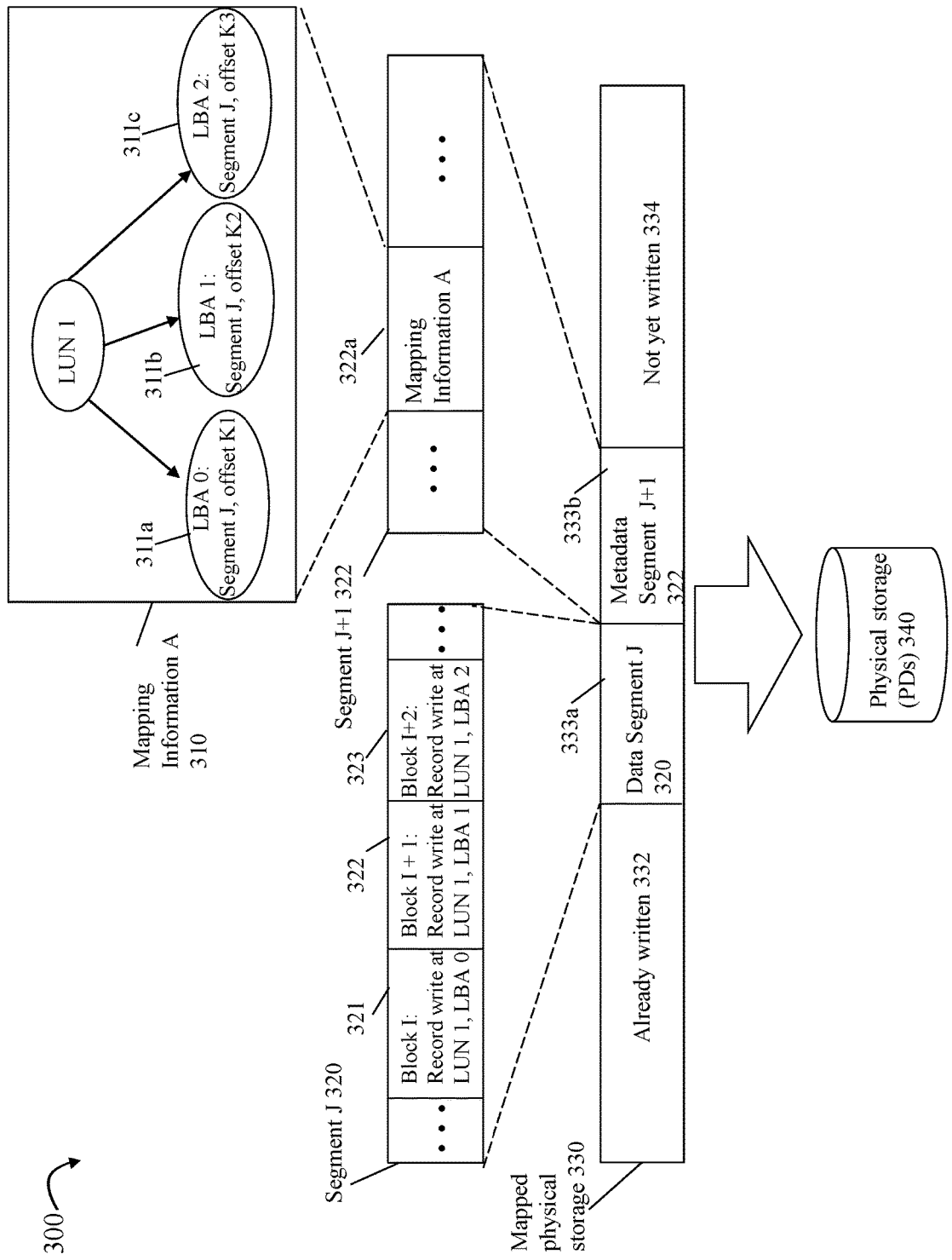

Referring to FIG. 4, shown is an example 300 further illustrating the log-based data layout using the blocks 221, 222 and 223 from FIG. 3. FIG. 3 includes mapping information A, segment J 320, segment J+1 322, mapped physical storage 330 and physical storage (PDs) 340. Element 310 may represent the logical to physical storage mapping information A 310 created for the foregoing blocks 221, 222 and 224. Elements 320 and 322 are in-memory segment buffers into which the blocks of the log file recording writes or updates are sequentially stored. Element 330 represents the physical layout of the log file data as stored on physical storage 340.

As denoted by mapping information A 310, each of the blocks 221, 222 and 223 has an associated logical address, denoted by a LUN identifier (e.g., LUN 1) and offset or LBA, which is mapped to a physical location. In this example, each physical location is denoted by a segment identifier and offset or location within the segment (identified by the segment identifier). Element 311a indicates that block I 221, having logical address LUN 1, LBA 0, is stored at a physical location identified by segment J, offset K1. Element 311b indicates that block I+1 222, having logical address LUN 1, LBA 1, is stored at a physical location identified by segment J, offset K2. Element 311c indicates that block I+2 223, having logical address LUN 1, LBA 2, is stored at a physical location identified by segment J, offset K3.

Consistent with discussion above and mapping information A 310, element 320 denotes segment J where the blocks 221, 222 and 223 are sequentially received and stored, respectively, in locations 321, 322 and 323 of the segment J 320. Segment J 320 may be an in-memory buffer into which the received blocks 221, 222 and 223 (denoting writes recorded in the log file) are stored. Element 321 denotes offset K1 within segment J 320. Element 322 denotes offset K2 within segment J 320. Element 323 denotes offset K3 within segment 320. Once the in-memory segment buffer J 320 is full, it is then written out to the virtual continuous log file created on the physical storage (PDs) 340.

Mapped physical storage 330 illustrates the sequential contiguous manner in which segments are written to the physical storage 340. In this example, data may be sequentially written to mapped physical storage 330 as follows: 332, 333a, 333b, and 334. Element 332 denotes the data segments written to the log file on LUN 1 prior to data segment J 320. Element 333a denotes the physical storage to which segment J 320 is written. Element 333b denotes the physical storage to which segment J+1 is written. Element 334 denotes the physical storage mapped to the log file that has not yet been written to at the point in time represented in the example 300. Writes to the log are clustered and logically sequential or contiguous. In one aspect, the data layout (e.g., format or structure) of the log-based data as stored on the PDs may also be physically sequential and contiguous where the PD is viewed logically as one large log having data that is laid out sequentially on the PD in the order it is written to the log.

Element 322 denotes segment J+1 which is sequentially logically contiguous with segment J 320. Segment J+1 322 in this example may store metadata information for the data blocks of segment J 320. Such metadata information may include the logical to physical mapping information A 310 that is stored at an offset 322a within segment J+1 322. Additionally, the metadata stored in segment J+1 322 for the writes or data blocks of segment J 320 may also include other information that may vary with the particular LFS implementation. For example, such other information of the metadata may be used to identify the particular file modified, updated or written to by the write recorded in the log file.

In an embodiment not in accordance with techniques herein, the physical storage or PDs 340 used to store the log file data using the log-based data layout such as illustrated in FIG. 4 may include SSD drives of the SSD tier. However, storing log file data with the log-based data layout of FIG. 4 on the SSD tier may be characterized in some aspects as an ineffective use of the expensive SSD tier storage that may be used more effectively in a different manner, such as described below. The log-based data layout as illustrated in FIG. 4 may be more suitable for use with PDs 340 that are rotating disk drive storage tiers, rather than SSDs. For example, the foregoing log-based data layout groups temporally related data (e.g., that are received together or sequentially in time) and places such data close to each other (e.g., spatial dependency). For rotating disk drives, the foregoing may provide for more efficient access of log file data, for example, in cases where such temporally related data may be accessed together (e.g., optimize hard disk drive head movement). Generally, the log-based data layout stores multiple data blocks at physical locations in the provisioned physical storage having a physical proximity to one another in accordance with a temporal relationship between the multiple data blocks (e.g., also distance between logical offset or locations in log file at which multiple data blocks are written). For example, data blocks in the log file that arrive at nearly the same time (e.g., within a defined time period and thus within a defined logical block or offset distance) may be placed or stored in the layout on physical storage relatively close to one another. The more closely related two blocks of the log file are in terms of time or logical location as written sequentially to the log file, the more closely positioned the two blocks may be stored on physical storage in the log-based data layout.

Described in following paragraphs is an embodiment in accordance with techniques herein that uses the more expensive SSD storage more efficiently. In such an embodiment, the log file data may be stored persistently using the log-based data layout of FIG. 4 where the PDs 340 of FIG. 4 are non-SSD drives or hard disk drives of one or more rotating disk drive tiers. Additionally, in such an embodiment in accordance with techniques herein, the SSD drive tier may be used as a caching layer in addition to the data cache. In at least one embodiment, the entire SSD tier, or at least a portion of the SSD tier, may be used a content addressable caching layer with deduplication support. The SSD tier may be used to implement a key-value data store providing a content addressable storage (CAS) caching layer with a data store that supports data deduplication. In such an embodiment, the SSD tier may be used as a caching layer to which active read data is promoted, but not active write data. It is assumed that the data cache uses sufficient data management techniques to efficiently store active write data. Since data promoted to the SSD tier in such an embodiment is also written and stored persistently on PDs of another rotating disk drive tier, there is no need to have PDs of the SSD tier configured in RAID groups since the data protection is provided by RAID groups of the rotating disk drive tier to which the log file data is also permanently stored. The foregoing and other advantages and details regarding techniques of such an embodiment are described in more detail below.

Figure 5:
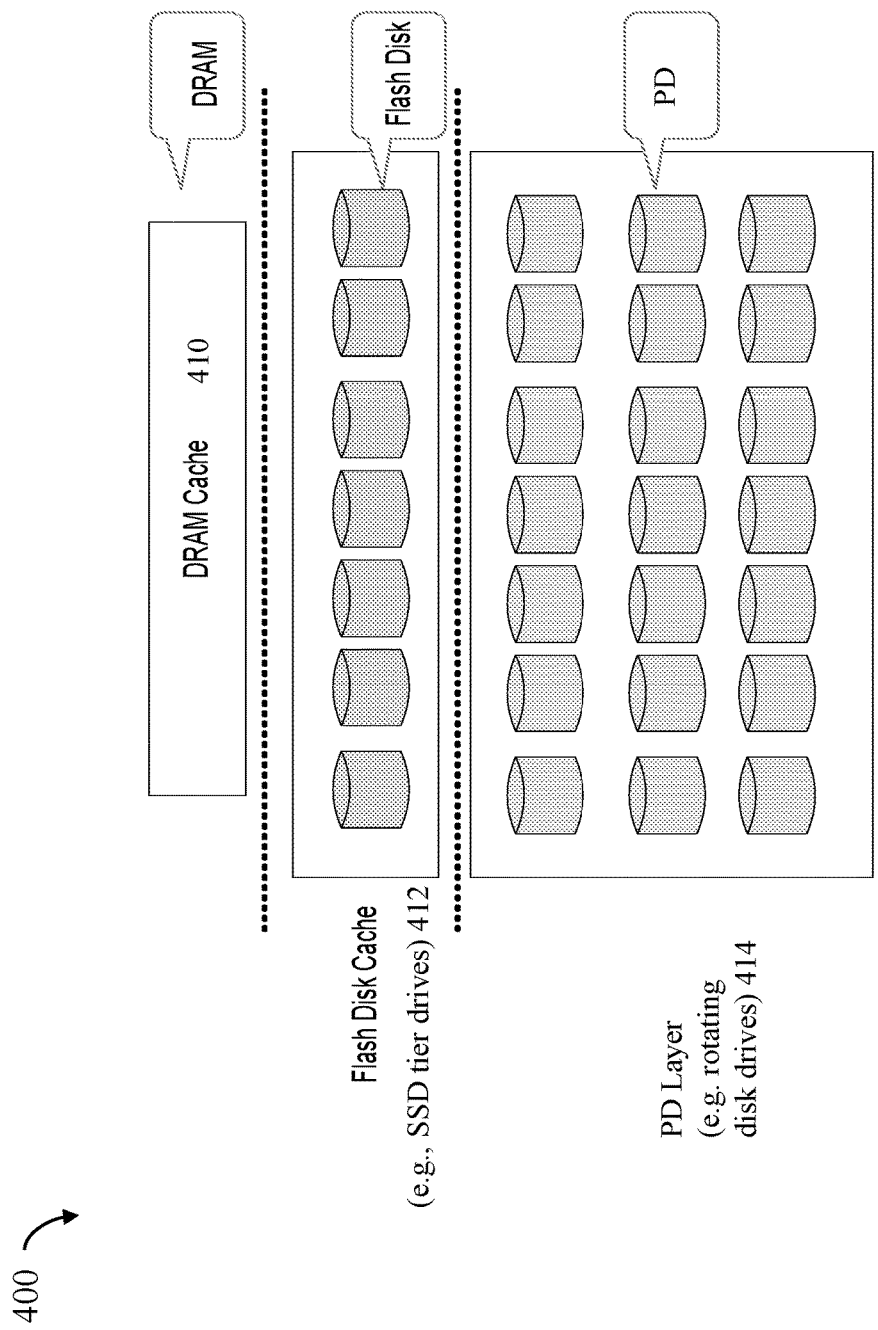
FIG. 5 is an example illustrating a plurality of layers including caches and physical backend storage in an embodiment in accordance with techniques herein.

Referring to FIG. 5, shown is an example illustrating a plurality of layers including caches and physical backend storage in an embodiment in accordance with techniques herein. The example 400 includes DRAM cache 410, flash disk cache 412, and a backend physical storage device (PD) layer 414. The flash disk cache 412 may include flash-based storage devices or, more generally, SSD drives of an SSD tier. The PD layer 414 may include, for example, rotating disk drives that provide non-volatile storage for data and may be organized into groups such as RAID groups providing the backend PDs which may be accessed, for example, by DAs when reading data from the PDs (such as to read data from the PD and then store such read data in the DRAM cache 410 cache to service a read miss) and/or when writing data to the PDs (such as to destage data from DRAM cache 410).

In at least one embodiment of a data storage system in the illustrated hierarchy of FIG. 4, the flash disk cache 412 is under the DRAM or general data cache 410, and below the flash disk cache 412 are backend PDs 414 of rotating disk drives or non-SSD tier drives. Generally, the DRAM cache 410, also referred to herein as the cache or data cache, may be the primary or highest caching layer such as mentioned above where read and write data are placed on first instance in connection with an I/O operation. Thus, in one aspect, the DRAM cache 410 may denote a level 1 (L1) primary cache and the flash disk cache 412 may denote a level 2 (L2) secondary cache. Element 410 may denote, for example, the cache to which data is first written when write operations are received by the host such as described above. Generally, the layers of FIG. 4 may be ranked, in terms of relative performance, from highest to lowest, as follows: DRAM cache 410, the flash disk cache 412, and rotating PDs 414. The flash disk cache 412 may include flash-based storage devices. More generally, the flash disk cache 412 may include a form of solid state that may be non-volatile which fits in with the above-mentioned relative performance ranking.

Flash disk cache 412 may include SSD drives of the SSD tier and may be characterized as a storage-system component that improves performance by transparently storing or promoting data from rotating non-SSD PDs 414 into flash disk media (flash disk) of layer 412, so that user requests for data can be served much faster than if retrieved from rotating PDs 414 (e.g. hard disk drives (HDDs)). PDs of layer 414 may be used to persistently store data and serve the I/O requests which cannot be serviced by using data from either DRAM cache 410 or flash disk cache 412. Generally, as mentioned above, PDs of layer 414 provide the slowest response time of all layers 410, 412 and 414 when there is a need to access the PD layer 414 to read data therefrom and/or write data thereto.

Data may be promoted from rotating PDs 414 to the Fast cache 412 based on "temperature" related to I/O activity or frequency of access. In at least one embodiment in accordance with techniques herein, such promotion is based on frequency of read access but not write access for the data. It is assumed that frequently updated or written data will be handled efficiently by the data cache or DRAM cache 410 and its associated cache management techniques (whereby caching of such data does not also need to be handled by caching layer 412). Additionally, in at least one embodiment in accordance with techniques herein, such promotion may be selectively enabled for use with particular log files, or LUNs that store such log file data, or more generally, store data based on the log-based data layout as described above (e.g., FIGS. 3 and 4). Placing or promoting data chunks from non-SSD, rotating PDs 414 is not dependent on whether the data is already in DRAM cache 410. In at least one embodiment, the PDs 414 may denote rotating disk drives or more generally non-SSD PDs having a lower performance than the flash-based drives of layer 412. In at least one embodiment, data may be stored in the flash disk cache in chunks having a particular suitable size, such as per block or LBA unit. An embodiment may selectively choose to enable or use the flash disk cache 412 in connection with log-based data that will more generally see a performance benefit in obtaining data from the flash disk cache 412 rather than non-SSD back-end storage devices 414. Thus, generally, the PDs of 414 may include rotational disk drives having an expected level of performance that is less than the expected level of performance when accessing data from SSD drives or physical storage comprising the flash disk cache 412.

In a manner similar to that as described above in connection with FIGS. 2 and 4, a memory map or mapping information may also be maintained by the flash disk cache layer 412 to indicate whether a particular data portion located at a particular LUN and offset (e.g., LBA) is currently stored in the flash disk cache and if so, the particular location in the flash disk cache where such data is located. As described elsewhere herein, the memory mapping information used by the flash disk cache layer 412 may use a two-level mapping structure that maps a logical address (e.g., LUN id and LBA) to its physical location in the SSD tier or flash disk cache 412. Generally, in addition to mapping information, the flash disk cache layer 412 may use one or more other structures referred to herein as the shadow cache to store other metadata that may be used by the flash disk cache 412. For example, the shadow cache may store information regarding the read access frequency or temperature of different data portions located at various LUN locations (e.g., LBAs) where such LUNs have storage provisioned from rotating PDs of the PD layer 414. Thus, the frequency of read access information in the shadow cache may be used to determine when to promote data from the PD layer 414 to the flash disk cache 412.

It should also be noted that the flash disk cache layer 412 may also experience cache or read hits and also cache or read misses with respect to whether requested read data is stored in the flash disk cache 412. Thus, the flash disk cache 412 may have associated states and experience cache hits and misses in a manner similar to the DRAM cache 410 used as the primary or level 1 cache in the hierarchy of FIG. 5.

Generally, the first time data is accessed for read or write, the data is stored in the DRAM cache 410 as the primary data cache in connection with I/O processing of the data path. Processing may be performed to monitor how frequently a particular data portion is accessed for reads (such as within a specified period of time) to determine whether such observed read access frequency reaches a threshold level to warrant storing such data also in the flash disk cache layer 412. The shadow cache described above may be used by the flash disk cache layer 412 to track such read access frequency for data at different LUN locations and determine when to promote a data portion stored at a particular LUN location from rotating PDs 414 to the flash disk cache 412.

In connection with processing an I/O operation such as a read operation, processing may first determine whether the requested read data is in the primary data cache, such as the DRAM cache 410. If so, the requested data is read from cache and returned to the requester. If the requested read data is not in the primary data cache (e.g., DRAM cache 410), processing may determine whether the requested data is stored in the flash disk cache 412. If so, the requested data is obtained from the flash disk cache 412 and returned to the requester. If the requested data is not in the flash disk cache 412, the requested data is obtained from rotating PDs 414, may be stored in the DRAM cache 410 and then returned to the requester. Additionally, depending on frequency of read access as described elsewhere herein, the data may also be stored in the flash disk cache 412. For example, if the requested data has an observed read access or frequency exceeding a specified threshold activity level, the requested read data may also be stored in the flash disk cache 412 (e.g., promoted to flash disk cache 412 if not already stored in 412).

In connection with write operations, the write data is written to the primary data cache, such as the DRAM cache 410, and an acknowledgement is returned to the requester that the write operation has complete. At some later point in time, processing may be performed to destage the write data from the DRAM cache 410 to the rotating PDs 414. In at least one embodiment when destaging the write data, a determination may be made as to whether the write data stored in the cache has also been accessed for reading more than a threshold number of times (e.g., has an observed read access or frequency exceeding a specified threshold activity level). If so, the write data being destaged may also be stored in the flash disk cache 412 (e.g., if not already stored in 412). Additionally, independent of whether the write data being destaged from DRAM cache 410 is also stored in the flash disk cache 412, the write data is written out to the rotating PDs 414. If the write data is not also stored in caching layer 412, the write data is written from the DRAM cache directly to the PDs 414.

Data promoted to the caching layer 412 may also be evicted or demoted whereby the data content is removed from the caching layer 412. Such demotion and eviction may be performed in accordance with any suitable cache management technique. For example, first data stored at a first logical address may be promoted to the caching layer 412 at a first point in time when there is a high level of read activity above a specified threshold directed to the first logical address. At a second subsequent point in time, a determination may be made to promote second data stored at a second logical address to the caching layer 412. However, the caching layer 412 may be full where there is currently no available storage to store the second data. Accordingly, processing may be performed to determine what existing data to evict or remove from the caching layer 412. At the second point in time, the read activity directed to the first logical address may have decreased below the specified threshold and/or may not have been recently referenced and the caching layer 412 may determine to evict the first data stored at the first logical address and store the second data thereby replacing the first data in the caching layer 412. Different cache management techniques are known in the art and any suitable technique may be used for management of the caching layer 412. For example, an embodiment may employ least recently used (LRU) cache management technique which may remove data from cache based on when the data has been last referenced. For example, a time stamp may be associated with each data portion stored in the caching layer 412 where the time stamp denotes the last time (e.g., date, hour, minutes, seconds in terms of wall clock time) the data portion was referenced for read. The most recently referenced data may have the most recent time stamp and may remain in the caching layer 412 longer than other data referenced having older time stamps. The foregoing time stamps may be used to select particular data for eviction when a new cache location is needed to store newly promoted data. The foregoing time stamps may also be used in a proactive cache management technique, for example, to select data for removal when the amount of free or available cache falls below a specified amount.

In an embodiment in accordance with techniques herein, the I/O path denoting the processing path taken in connection with processing a user or host I/O operation may pass through the layers such as illustrated in FIG. 5. Processing may be performed at the various layers as described herein to determine what steps are performed in connection with processing the I/O operation.

Consistent with discussion above, the log file may be persistently stored on non-SSD or rotating PDs using the log-based physical data layout such as described and illustrated in connection with FIGS. 3 and 4. Additionally, as also discussed above, processing may be performed to determine whether data of the log file that is frequently access for reading should be promoted to the flash disk cache 412 comprising SSD drives of the SSD tier. In this manner, such as described in connection with FIG. 5, the flash disk caching layer 412 of SSDs may be used as a caching layer to cache portions of the log files that are frequently accessed for read (e.g., portions of the log file have an associated read activity level or frequency, within a defined period of time, that exceeds a threshold level). In at least one embodiment, data portions of the log file may be promoted on a per block or LUN logical address unit basis (e.g., LUN block size is the level of granularity of promotion to the flash disk cache 412). However, other embodiments may vary the granularity size of the data portions of the log file promoted as an atomic unit to the flash disk cache 412. An embodiment in accordance with techniques herein may provide for selectively enabling or disabling use of the flash disk cache layer 412 for use with certain LUNs, portions of LUNs, or more generally, suitable storage entities (or portions thereof).

In an embodiment in accordance with techniques herein, the flash disk cache layer 412, such as implemented using flash drives of the SSD storage tier, may be used as a content addressable storage (CAS) caching layer with data deduplication support which is described in more detail in following paragraphs and figures.

Data deduplication generally refers to removing redundant or duplicate data portions. Data deduplication techniques may include looking for duplicate data chunks whereby only a single instance of the data chunk is retained (stored on physical storage) and where pointers or references may be used in connection with duplicate or redundant copies (which reference or identify the single stored instance of the data chunk). As described in more detail below, the CAS caching layer (e.g., as represented by 412 of FIG. 5) provides physical storage for storing data but where the data stored at a physical location in the CAS caching layer is not addressed by its physical location. Rather, the data is addressed or referenced by a unique name, token, identifier, and like, derived from the content of the data stored at a physical location in the CAS caching layer. In at least one embodiment, a hash value derived from the content or data using a hash function may be used to refer to the content or data stored at a physical location in the CAS caching layer. As known in the art, the hash value may be generated using a hash function such as a cryptographic hashing function or other suitable hash function.

Figure 6A:
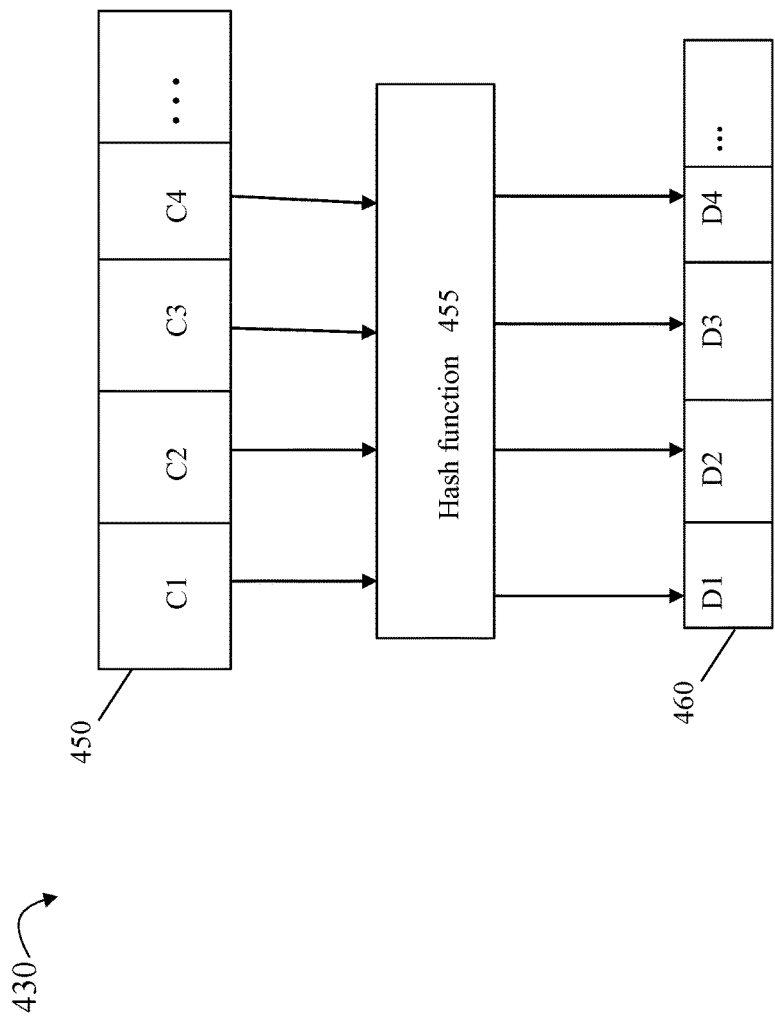
FIG. 6A is an example illustrating hashing in an embodiment in accordance with techniques herein.

Referring to FIG. 6A, shown is an example 430 illustrating processing that may be performed in connection with data deduplication processing in an embodiment in accordance with techniques herein. Element 450 may denote the original data being written or stored such as in the CAS caching layer. The original data may be partitioned into multiple data chunks C1, C2, C3, C4 and the like. In at least one embodiment, the data chunks may all be the same size, such as a single logical block. However, the size may vary with embodiment. Each chunk is provided as an input to hash function 455. In at least one embodiment, the hash function 215 may be the SHA-256 or SHA-1 hashing algorithm, or more generally, any suitable cryptographic hashing function known in the art. For each chunk of 450, the hash function 455 may perform processing and generate, as an output, a hash, hash value or digest. Element 460 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 455 is selected which has an acceptably low probability of a "hash collision" of generating the same digest or hash value for two different chunks. The strength of the hash function 455 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks). If two chunks, such as C1 and C4, have different digests whereby D1 does not equal D4, then chunks C1 and C4 do not match (e.g., are different or non-matching data chunks). In cases where two matching or identical chunks have the same digest, only a single copy of the data chunk is stored in the CAS caching layer. The single stored instance of the data chunk may be referenced, for example, using the digest, which is the hash value of the data chunk stored in the CAS caching layer. In cases of a hash collision (where two data chunks result in generating the same digest), an embodiment may use any suitable technique to handle the collision. For example, in one embodiment, a list may be maintained for different data chunks mapping to the same digest. When determining whether a new data chunk is a duplicate of an existing data chunk already stored, the new data chunk may be considered a duplicate if the new data chunk and the existing chunk have the same digest. Additionally, processing may include comparing the new and existing data chunks (e.g., bit for bit) and determining whether the new data chunk matches one of the existing data chunks on the list.

Figure 6B:
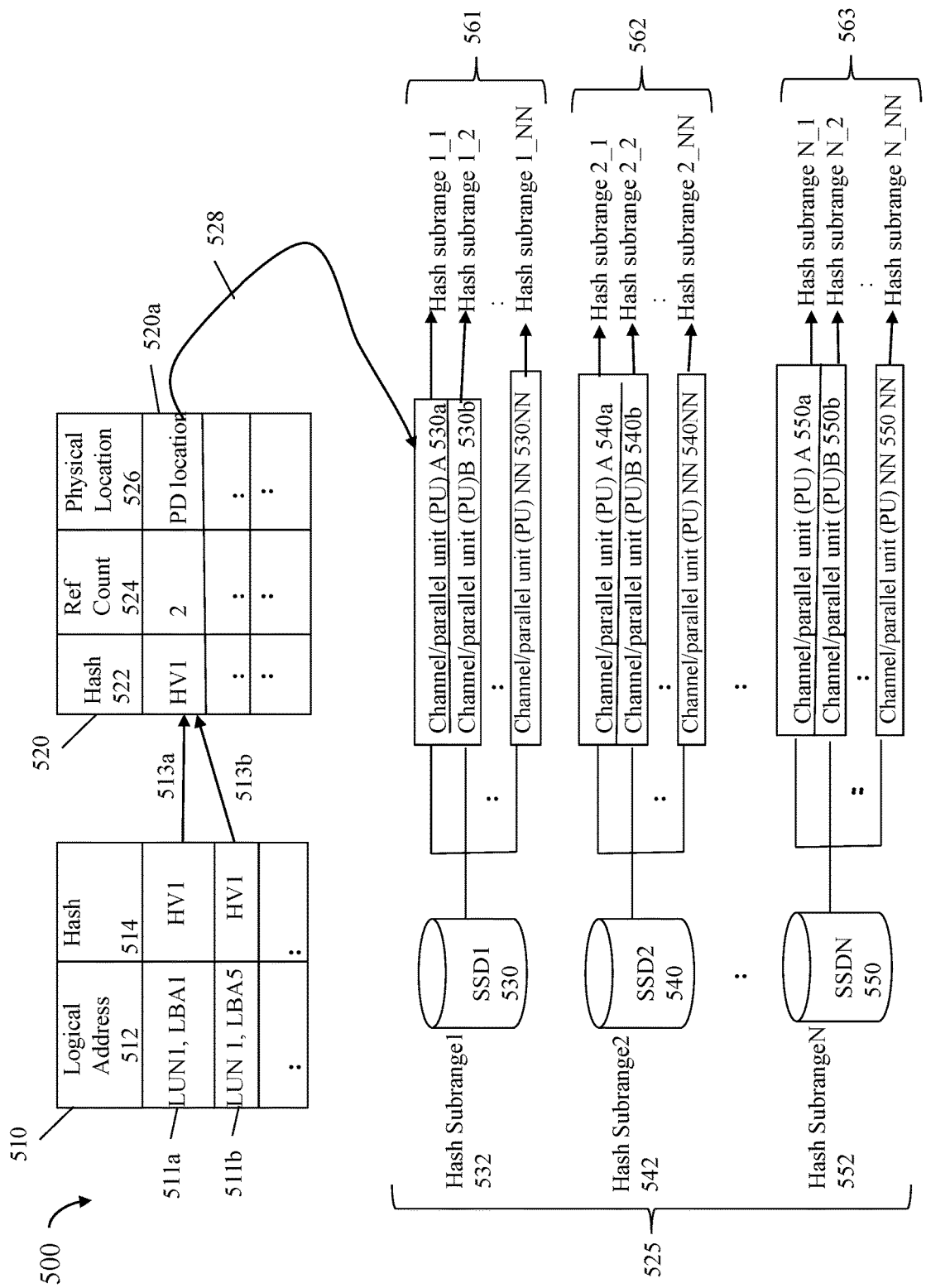
FIG. 6B is an example illustrating mapping structures and solid state drives, such as flash drives, that may be used in an embodiment in accordance with techniques herein.

In at least one embodiment in accordance with techniques herein, the actively read log-based data of the log file promoted from the rotating disk drive layer 414 to the CAS caching layer, as represented by flash disk cache layer 412 of FIG. 5, may hold only the unique data blocks and use a two level mapping from logical address (e.g., LUN identifier and LBA) to physical location (e.g., SSD identifier of the flash drive and location on SSD or flash drive) of where the data is stored in the CAS caching layer as described below in more detail with reference now to FIG. 6B.

The example 500 of FIG. 6B includes a first mapping structure or table 510, a second mapping structure or table 520 and flash drives, or more generally, SSD drives 525 comprising the storage of the CAS caching layer. Collectively, the two mapping structures 510 and 520 provide the needed logical to physical mapping to retrieve a data block stored in the CAS caching layer using the data block's logical address. The SSD drives 525 of the CAS caching layer in this example include N SSDs, N being an integer greater than 2. Generally, any suitable number of SSD drives may be used as represented by 525.

The first mapping structure 510 includes a column of logical addresses 512 and hash values 514. A single row of 510 denotes that the data chunk or block stored at the logical address in column 512 of the row has an associated hash value as identified in column 514 of the row. For example, row 511a indicates that the data block stored at LUN 1, LBA1 has a corresponding hash value HV1, and row 511b indicates that the data block stored at LUN 1, LBA5 has a corresponding hash value HV1. The second mapping structure 520 includes the following 3 columns: column 522 of hash values, column 524 of reference (ref) counts, and column 526 of physical locations. A single row of 520 denotes that the data chunk or block stored having an associated hash value as identified in column 522 of the row has an associated reference count identified in column 524 of the row where the data chunk or block is stored in the CAS caching layer at the physical location identified in column 526 of the row. The ref count 524 of the row identifies the number of times that the data block stored at the physical location of column 526 of the row is referenced. In this context of this application, the ref count 524 of a particular row in table 520 denotes the number of different logical addresses (e.g., rows) of structure 510 having the same data content as stored at the physical location of column 526 of the particular row of table 520. For example, row 520a indicates that the data block having the hash value HV1 with reference (ref) count=2 is stored at physical location PD location. The PD location may be denoting by a physical drive identifier and offset or location on the physical drive. For example, as denoted by arrow 528, the PD location in row 520a, column 526 is an offset or location on SSD1 530. The offset value of 2 in ref count column 524 of row 520a indicates that 2 logical addresses or rows of table 510 have the same data content (as stored at PD location in column 526 of row 520a).

As denoted by arrows 513a and 513b, each row of the first mapping structure 510 maps to a row of the second mapping structure 520. In this example, 513a and 513b map to the same single row 520a of the second mapping structure because the data content stored at the two logical addresses LUN1, LBA1 and LUN 1, LBA 5 (as denoted by column 512 of rows 511a-b, respectively) is the same (e.g., a duplicate of one another). The second mapping structure 520 may be more generally known as a hash table with rows or entries indexed by the hash values of the data content stored in the SSDs of 525 of the CAS caching layer. The ref count 524 (e.g., 2) of a row (e.g., 520) in table 520 identifies the number of rows of table 510 (e.g., 511a-b) that have corresponding hash values in column 514 that map to the row.

Each time data content of a new logical address is promoted to the CAS caching layer, an entry is created in table 510. Subsequently, the data content's hash value is used to index into the table 520. If there is no existing entry in table 520 having the data content's hash value, a new entry is created in table 520 for the hash value and the data content is stored on one of the SSDs of 525 of the CAS caching layer. If there is an existing entry in the table 520 having the same hash value as the new logical address's data content, it means the new logical address's data content is a duplicate of an existing entry in table 520 and the ref count 524 of the existing entry in 520 is incremented by 1. For example, assume that both tables 510 and 520 are empty and a decision is made to promote the data content stored at LUN 1, LBA1 to the CAS caching layer. At this point, processing creates row 511a in table 510, determines there is no matching entry in table 520 with the hash value HV1 in column 522, creates row/entry 520a in table 520 with a reference count 524=1, and stores the data content at PD location. At a second point in time, a decision is made to promote the data content stored at LUN A, LBA 5 to the CAS caching layer. Processing is performed that creates row 511b and determines that there is an existing entry 520a in table 520 having the same hash value HV1 that matches HV1 of the newly added entry 511b of table 510. In this case, the reference count 524 of row 520a is incremented from 1 to 2 and no additional data content is stored in the SSDs 525 of the CAS caching layer.

When data associated with a logical address is removed from the CAS caching layer (e.g., such as with demotion, eviction or general cache management), an existing entry from table 510 for the logical address is removed from table 510. Generally, each time a row in table 510 having a hash value in column 512 is removed, a corresponding row in table 520 having the same hash value in column 522 has its ref count 524 decremented by 1. For example, assume it is determined to remove the data associated with LUN 1, LBA1 from the CAS caching layer. In this case, row 511a is removed from the table 510. Additionally, the row 520a from table 520 mapped 513a to row 511a (via the hash value HV1) is determined and its ref count 524 is decremented by 1 (from 2 to 1). Once the reference counter 524 of an entry in table 520 reaches zero (0), the entry in table 520 may be removed and the physical storage of the associated physical location for the entry may be reused (e.g., current data contents invalidated).

It should be noted that in at least one embodiment, the physical location 526 of a row may also reference a procedure used to generate the data content or data value that may represent the data content. For example, an embodiment may have a special procedure or special data value used to denote a data block having all zeroes stored as the content. Rather than actually allocate a block of storage from an SSD of 525, an embodiment may use a special data value stored in the physical location column 526 of a row to indicate that the data block has all zeroes as the data content. Such special data values of procedures may be used in connection with well-known or common data patterns or values to provide a further optimization for use with the CAS caching layer.

As noted above, element 525 represents the SSD drives of the CAS caching layer storing the promoted data. In at least one embodiment, the range of hash values that can be generated by the hash function may be partitioned into portions or subrange. Each hash subrange may be the same size. For example, the entire hash value range may be partitioned into N equal subranges. Collectively, the N subranges are sequential and contiguous spanning the entire hash range value, without overlap (e.g., no hash value is included in more than one of the N subranges and each of the hash values of the hash value range is included in one of the N subranges). N may generally be a positive integer value and represent the number of SSD drives of 525 in the CAS caching layer. In at least one embodiment, each of the N SSDs may be uniquely associated with one of the N subranges and store data content for its associated hash subrange. For example, with reference to FIG. 6B, SSD1 530 stores data content for entries of table 520 having hash values in the hash subrange 1 532, SSD2 540 stores data content for entries of table 520 having hash values in the hash subrange 2 542, . . . and SSD N 550 stores data content for entries of table 520 having hash values in the hash subrange N 552. Thus, each of the N SSDs of 525 is responsible for storing content of a specified subrange of the hash value range meaning that unique data blocks are randomly and evenly distributed between the different N SSDs.

In at least one embodiment, each of the N SSDs of 525 may have multiple parallel channels or units providing for parallel access to the SSD. For example, assume that each of the N SSDs of 525 has NN channels that may be used in parallel to access data on the single SSD. NN in this example is 3 or greater. However, generally, NN is any suitable positive integer that may vary with embodiment. Also, although each of the SSDs is shown as having the same number of NN channels, each of the SSDs may not have the same number of channels. Assuming as in the example 500 that each of the N SSDs of 525 has NN channels or units providing for parallel access, the hash subrange associated with each of the N SSDs may be further partitioned into NN portions to further partition the load and responsibility of the hash subrange among the NN channels of the single SSD. For example, SSD1 530 is responsible for handling reads and writes with respect to data content having associated hash values in hash subrange 1 532. SSD1 530 may have channels or parallel units (PUs) 530*a*-NN. The hash subrange 1 532 may be further partitioned into NN equal portions denoted by hash subranges 1_1 through 1_NN 561. Each of the channels or PUs 530*a*-NN may be responsible for handling I/O operations (e.g., read and writes) for data content associated with hash values, respectively, in the hash subranges 1_1 through 1_NN 561 (e.g., channel/PU 530*a* handles I/Os for data content associated with hash values in hash subrange 1_1; channel/PU 530*b* handles I/Os for data content associated with hash values in hash subrange 1_2; . . . channel/PU 530 NN handles I/Os for data content associated with hash values in hash subrange 1_NN. SSD2 540 is responsible for handling reads and writes with respect to data content having associated hash values in hash subrange 2 542. SSD2 540 may have channels or parallel units (PUs) 540*a*-NN. The hash subrange 2 542 may be further partitioned into NN equal portions denoted by hash subranges 2_1 through 2_NN 562. Each of the channels or PUs 540*a*-NN may be responsible for handling I/O operations (e.g., read and writes) for data content associated with hash values, respectively, in the hash subranges 2_1 through 2_NN 562 (e.g., channel/PU 540*a* handles I/Os for data content associated with hash values in hash subrange 2_1; channel/PU 540*b* handles I/Os for data content associated with hash values in hash subrange 2_2; . . . channel/PU 540 NN handles I/Os for data content associated with hash values in hash subrange 2_NN. Similarly, SSDN 550 is responsible for handling reads and writes with respect to data content having associated hash values in hash subrange N 552. SSDN 550 may have channels or parallel units (PUs) 550*a*-NN. The hash subrange N 552 may be further partitioned into NN equal portions denoted by hash subranges N_1 through N_NN 563. Each of the channels or PUs 550*a*-NN may be responsible for handling I/O operations (e.g., read and writes) for data content associated with hash values, respectively, in the hash subranges N_1 through N_NN 563 (e.g., channel/PU 550*a* handles I/Os for data content associated with hash values in hash subrange N_1; channel/PU 550*b* handles I/Os for data content associated with hash values in hash subrange N_2; . . . channel/PU 550 NN handles I/Os for data content associated with hash values in hash subrange N_NN.

Thus, further partitioning each SSDs hash subrange among its channels or PUs provides for distributing the load with each single SSD for further load balancing. Based on the above, read I/Os to read data cached in the CAS caching layer may be distributed among the N SSDs of 525, and further distributed among each single SSD's internal channels or PUs.

In at least one embodiment, the tables 510 and 520 may be stored in cache, such as, for example, the DRAM data cache 410 (e.g., L1 caching layer).

It should be noted that in at least one embodiment in accordance with techniques herein, RAID groups providing data protection may be formed for PDs of the rotating PD tiers persistently storing the log-based data of a log file in accordance with the physical data layout such as described in connection with FIG. 4. However, in at least embodiment, the SSDs 525 of the SSD tier used as the CAS caching layer (e.g., 412 of FIG. 5) may not form RAID groups There is no RAID group data protection for the CAS caching layer since its SSDs are only used for caching. The primary copy of the data content of the log-based data, some of which may be cached in the CAS caching layer, is stored on rotating PDs of other tiers 414 which may be formed into RAID groups. In at least one embodiment in accordance with techniques herein, the mapping structures 510 and 520 may be used to map a logical address to its cached physical location in the CAS caching layer and retrieve the cached data content of the logical address, for example, in connection with servicing a read I/O operation from a client, such as a host. Additionally, depending on embodiment, various components of the data storage system may also access data content stored in the SSDs of the CAS caching layer using the hash value for the data content.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   receiving, at a data storage system, a write operation that writes first data to a target logical address, wherein the data storage system includes a plurality of storage tiers including a first storage tier of rotating non-volatile storage devices and a second tier of non-volatile solid state storage devices;
   storing the first data of the target logical address in a first level cache;
   destaging the first data from the first level cache to a first physical storage location in the first storage tier; and
   determining, in accordance with first read activity information for the target logical address, whether to promote the first data, which is written to the target logical address, to a second level cache of non-volatile storage, wherein the second level cache includes at least a portion of the non-volatile solid state storage devices of the second tier, wherein the second level cache is a content addressable caching layer that caches promoted data based only on read activity denoting a frequency of read access of the promoted data, wherein the second level cache includes a plurality of non-volatile solid state storage devices and data content stored in the second level cache is mapped to a corresponding hash value included in a range of hash values, and wherein the range of hash values is partitioned into a plurality of subranges and each of the plurality of non-volatile solid state storage devices is associated with one of subrange of the plurality of subranges and said each non-volatile solid state storage device is responsible for processing I/O operations directed to data content having an associated hash value in said one subrange, wherein said each non-volatile solid state storage device is responsible for reading data content having an associated hash value in said one subrange associated with said each non-volatile solid state data storage device, wherein each of the plurality of subranges is partitioned in a second plurality of subranges, and wherein said each non-volatile solid state storage device has a plurality of channels over which data on said each non-volatile solid state storage device is accessible in parallel and wherein each of the plurality of channels is used to read data content having an associated hash value in one of the second plurality of subranges of said one subrange associated with said each non-volatile solid state storage device.

2. The method of claim 1, further comprising responsive to determining, in accordance with the first read activity information for the target logical address, to promote the first data, which is written to the target logical address, to the second level cache, performing first processing including:
   determining, using a hashing function, a first hash value for the first data, wherein the first hash value is included in the range of hash values;
   creating a first entry for the target logical address in a first mapping structure, said first entry including the target logical address and the first hash value;
   determining whether there is an existing entry for the first hash value in a second mapping structure; and
   responsive to determining there is the existing entry for the first hash value in the second mapping structure, determining that the first data is a duplicate of existing data already stored in the second level cache and incrementing a reference counter associated with the existing entry, wherein a second entry of the first mapping structure includes a second logical address at which the first data, having the first hash value, is stored.

3. The method of claim 2, wherein the first processing further comprises:
   responsive to determining there is no existing entry for the first hash value in the second mapping structure, determining that the first data is not a duplicate of data already stored in the second level cache and performing second processing.

4. The method of claim 3, wherein the second processing includes:
   storing the first data for the first hash value in a first physical storage location in the second level cache; and
   creating a first entry in the second mapping structure for the first hash value, wherein the first entry includes the first hash value, includes a reference counter initialized to one (1), and identifies the first physical storage location as storing the first data associated with the first hash value.

5. The method of claim 4, further comprising performing third processing to remove the first data stored at the target logical address from the second level cache, the third processing including:
   removing the first entry for the target logical address from the first mapping structure;
   determining a corresponding entry of the second mapping structure for the first hash value for the first data; and
   decrementing a reference counter of the corresponding entry of the second mapping structure for the first hash value for the first data.

6. The method of claim 5, further comprising:
   determining whether the reference counter of the corresponding entry of the second mapping structure for the first hash value for the first data is zero; and
   responsive to determining the reference counter of the corresponding entry of the second mapping structure for the first hash value for the first data is zero, removing the corresponding entry from the second mapping structure and freeing physical storage of the second level cache used to store the first data.

7. The method of claim 2, wherein said each non-volatile solid state storage device is responsible for storing data content having an associated hash value in said one subrange associated with said each non-volatile solid state data storage device.

8. The method of claim 1, wherein the non-volatile solid state storage devices of the second tier comprising the second level cache are flash drives.

9. The method of claim 1, wherein the write operation is recorded in a log, and wherein the log has a log-based data layout on physical storage provisioned for the log from the first storage tier of rotating non-volatile storage devices.

10. The method of claim 9, wherein data is written to the log at contiguous and sequential logical addresses.

11. The method of claim 10, wherein data is sequentially written to the log-based data layout of the log on provisioned physical storage of the first storage tier in segments.

12. The method of claim 11, wherein the log-based data layout stores multiple data blocks at physical locations in the provisioned physical storage of the first tier having a physical proximity to one another in accordance with a temporal relationship between the multiple data blocks and in accordance with logical locations in the log at which the multiple data blocks are written.

13. The method of claim 1, wherein said determining whether to promote the first data, which is written to the target logical address, to the second level cache further includes:
 determining whether the first read activity associated with the target logical address exceeds a specified threshold; and
 responsive to determining the first read activity of the target logical address does not exceed the specified threshold, determining not to promote the first data stored at the target logical address to the second level cache and not to store the first data of the target logical address in the second level cache.

14. A system comprising:
 one or more processors; and
 a memory comprising code stored thereon that, when executed, performs a method of processing I/O operations comprising:
  receiving, at a data storage system, a write operation that writes first data to a target logical address, wherein the data storage system includes a plurality of storage tiers including a first storage tier of rotating non-volatile storage devices and a second tier of non-volatile solid state storage devices;
  storing the first data of the target logical address in a first level cache;
  destaging the first data from the first level cache to a first physical storage location in the first storage tier; and
  determining, in accordance with first read activity information for the target logical address, whether to promote the first data, which is written to the target logical address, to a second level cache of non-volatile storage, wherein the second level cache includes at least a portion of the non-volatile solid state storage devices of the second tier, wherein the second level cache is a content addressable caching layer that caches promoted data based only on read activity denoting a frequency of read access of the promoted data wherein the second level cache includes a plurality of non-volatile solid state storage devices and data content stored in the second level cache is mapped to a corresponding hash value included in a range of hash values, and wherein the range of hash values is partitioned into a plurality of subranges and each of the plurality of non-volatile solid state storage devices is associated with one subrange of the plurality of subranges and said each non-volatile solid state storage device is responsible for processing I/O operations directed to data content having an associated hash value in said one subrange, wherein said each non-volatile solid state storage device is responsible for reading data content having an associated hash value in said one subrange associated with said each non-volatile solid state data storage device, wherein each of the plurality of subranges is partitioned in a second plurality of subranges, and wherein said each non-volatile solid state storage device has a plurality of channels over which data on said each non-volatile solid state storage device is accessible in parallel and wherein each of the plurality of channels is used to read data content having an associated hash value in one of the second plurality of subranges of said one subrange associated with said each non-volatile solid state storage device.

15. A non-transitory computer readable medium comprising code stored thereon that, when executed, performs a method of processing I/O operations comprising:
 receiving, at a data storage system, a write operation that writes first data to a target logical address, wherein the data storage system includes a plurality of storage tiers including a first storage tier of rotating non-volatile storage devices and a second tier of non-volatile solid state storage devices;
 storing the first data of the target logical address in a first level cache;
 destaging the first data from the first level cache to a first physical storage location in the first storage tier; and
 determining, in accordance with first read activity information for the target logical address, whether to promote the first data, which is written to the target logical address, to a second level cache of non-volatile storage, wherein the second level cache includes at least a portion of the non-volatile solid state storage devices of the second tier, wherein the second level cache is a content addressable caching layer that caches promoted data based only on read activity denoting a frequency of read access of the promoted data, wherein the second level cache includes a plurality of non-volatile solid state storage devices and data content stored in the second level cache is mapped to a corresponding hash value included in a range of hash values, and wherein the range of hash values is partitioned into a plurality of subranges and each of the plurality of non-volatile solid state storage devices is associated with one of the plurality of subranges and said each non-volatile solid state storage device is responsible for processing I/O operations directed to data content having an associated hash value in said one subrange, wherein said each non-volatile solid state storage device is responsible for reading data content having an associated hash value in said one subrange associated with said each non-volatile solid state data storage device, wherein each of the plurality of subranges is partitioned in a second plurality of subranges, and wherein said each non-volatile solid state storage device has a plurality of channels over which data on said each non-volatile solid state is accessible in parallel and wherein each of the plurality of channels is used to read data content having an associated hash value in one of the second plurality of subranges of said one subrange associated with said each non-volatile solid state storage device.

16. The non-transitory computer readable medium of claim 15, wherein the method further comprises:
 responsive to determining, in accordance with the first read activity information for the target logical address, to promote the first data, which is written to the target logical address, to the second level cache, performing first processing including:
- determining, using a hashing function, a first hash value for the first data, wherein the first hash value is included in the range of hash values;
- creating a first entry for the target logical address in a first mapping structure, said first entry including the target logical address and the first hash value;
- determining whether there is an existing entry for the first hash value in a second mapping structure; and
- responsive to determining there is the existing entry for the first hash value in the second mapping structure, determining that the first data is a duplicate of existing data already stored in the second level cache and incrementing a reference counter associated with the existing entry, wherein a second entry of the first mapping structure includes a second logical address at which the first data, having the first hash value, is stored.

17. The non-transitory computer readable medium of claim 16, wherein the first processing further comprises:
- responsive to determining there is no existing entry for the first hash value in the second mapping structure, determining that the first data is not a duplicate of data already stored in the second level cache and performing second processing.

18. The non-transitory computer readable medium of claim 17, wherein the second processing includes:
- storing the first data for the first hash value in a first physical storage location in the second level cache; and
- creating a first entry in the second mapping structure for the first hash value, wherein the first entry includes the first hash value, includes a reference counter initialized to one (1), and identifies the first physical storage location as storing the first data associated with the first hash value.

* * * * *